March 16, 1948.　　　N. F. ADAMSON　　　2,437,670
FLUID OPERATED CLUTCH
Filed Nov. 6, 1943　　　3 Sheets-Sheet 3
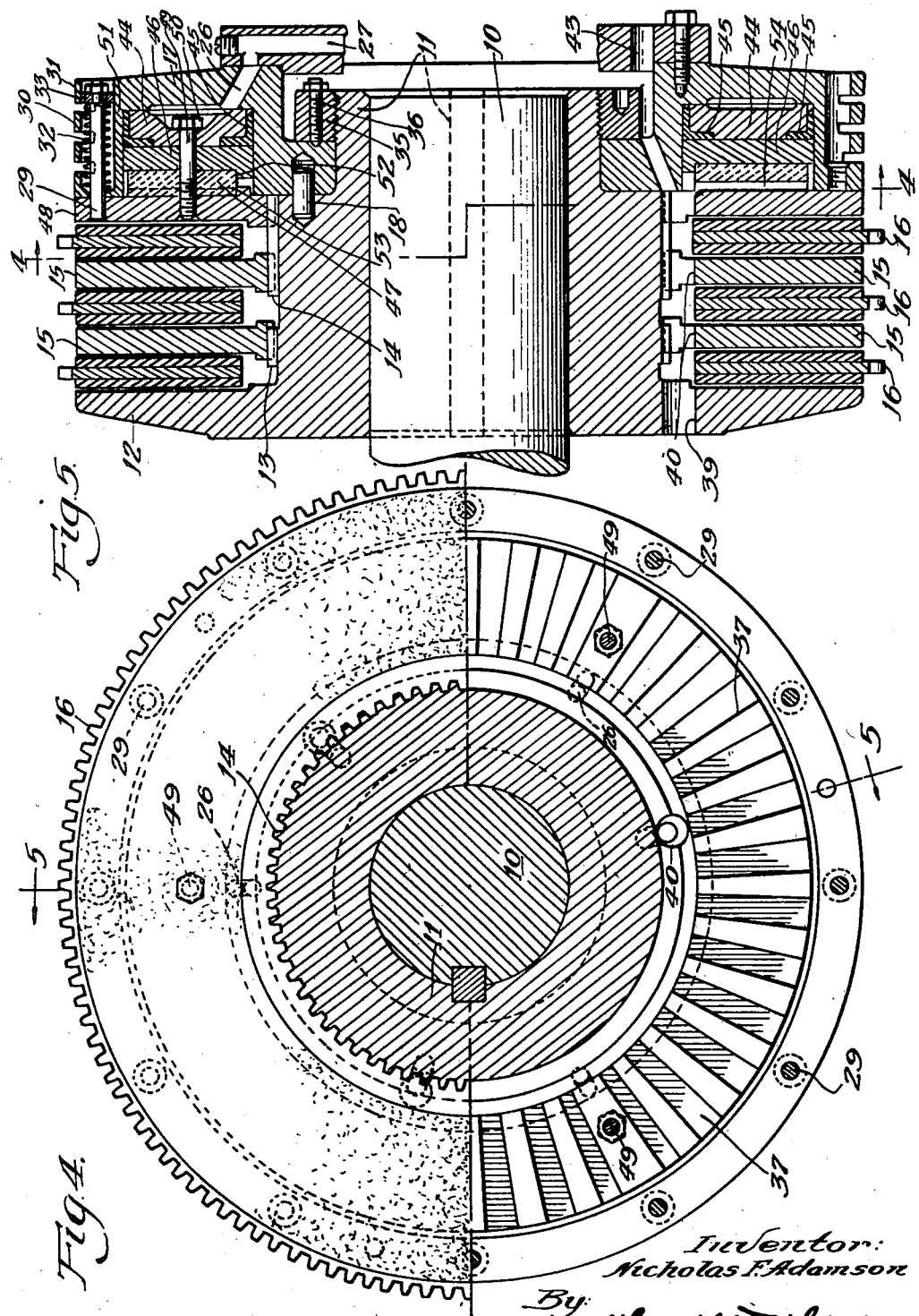

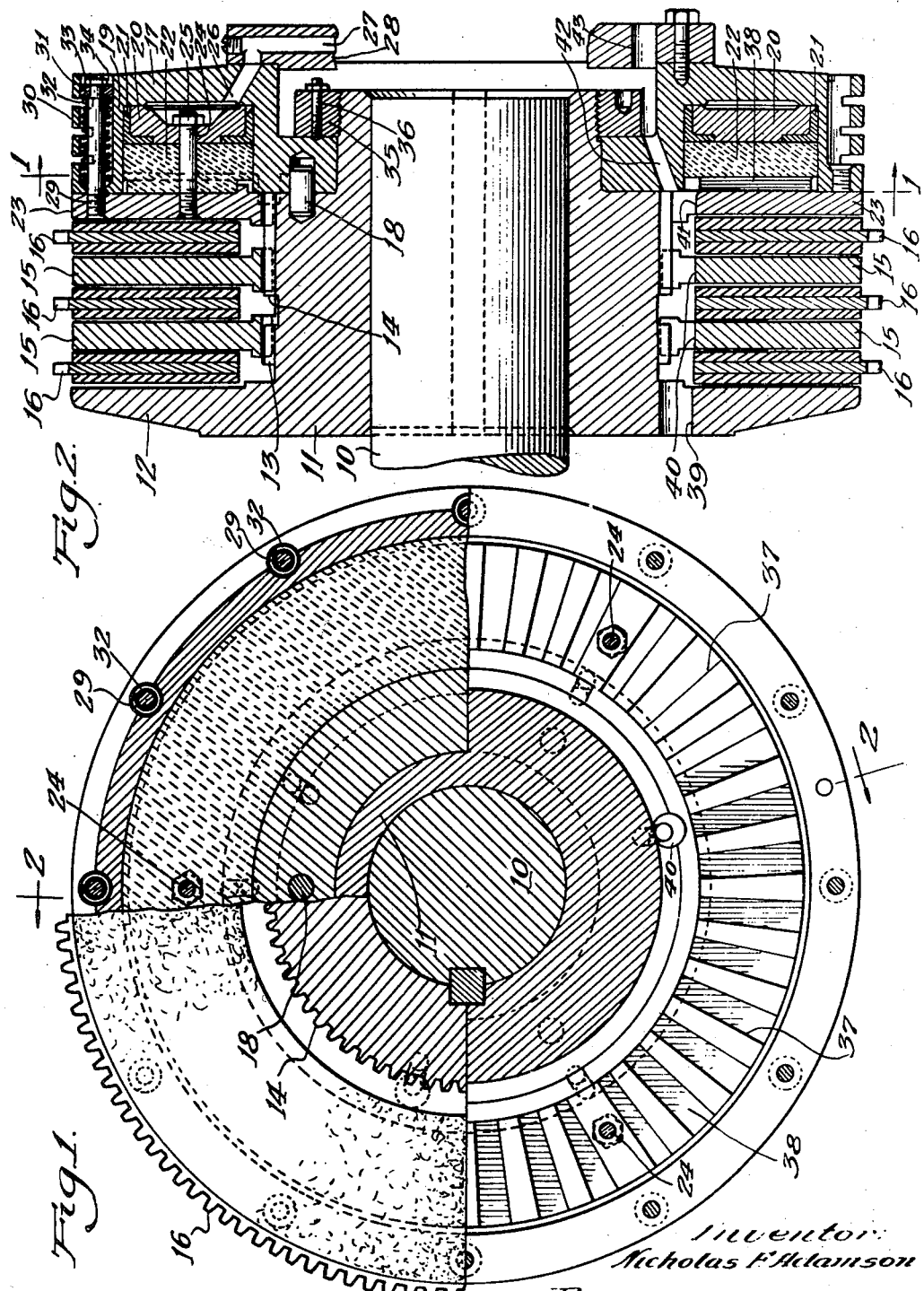

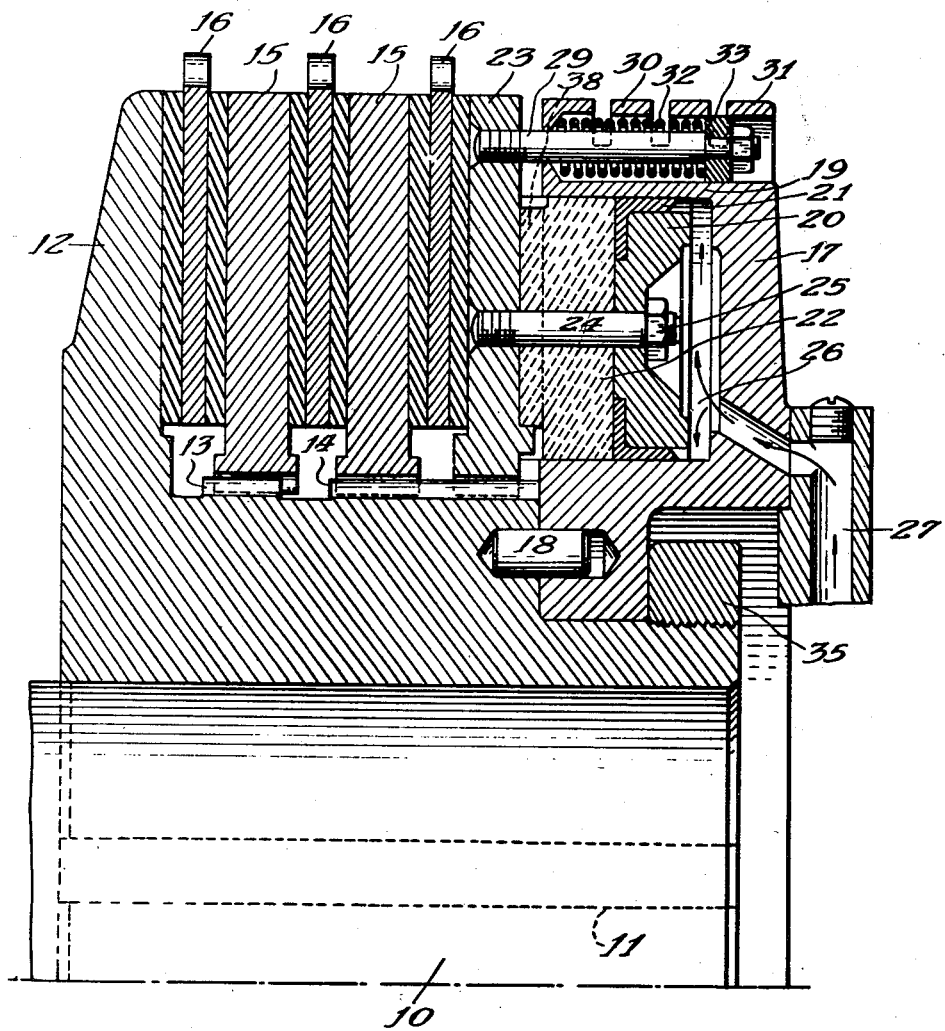

Patented Mar. 16, 1948

2,437,670

UNITED STATES PATENT OFFICE 2,437,670

FLUID OPERATED CLUTCH

Nicholas F. Adamson, Racine, Wis., assignor to Twin Disc Clutch Company, Racine, Wis., a corporation of Wisconsin Application November 6, 1943, Serial No. 509,332

13 Claims. (Cl. 192—85)

My invention relates to clutches and more particularly to those of the fluid actuated type in which any selected fluid under pressure, either gas or liquid, is applied to a piston which constitutes the actuating element of the clutch.

Clutches of this general type wherein an annular piston applies the engaging pressure are well known and, for certain installations, they possess a number of advantages over the more common clutch arrangement in which the engaging pressure is applied at spaced locations around the clutch through mechanisms including links and levers. Some of these advantages are a uniform and continuous application of the engaging pressure around the clutch, quick action in engagement and disengagement which is particularly important when the associated machine is designed for repetitive, short working cycles, and capacity for rapid acceleration and deceleration and quick reversals.

When employed under the foregoing conditions, the efficient control and dissipation of the generated heat presents a serious problem because it is important that the fluid cylinder assembly, including the release springs, be kept relatively cool.

It is therefore one object of my invention to provide a fluid operated clutch in which insulating means are interposed between the clutch pressure plate and the actuating piston.

A further object is the provision in the foregoing type of clutch of means, other than the piston, for piloting the piston during its movements in order to lessen wear on the piston packing.

A further object is to devise a clutch of the character indicated wherein the insulating means may additionally serve to pilot the piston in the cylinder.

A further object is to provide a fluid operated clutch which is cooled during engagement by streams of air induced by the rotation of the clutch and which flow through the interior of the clutch between the pressure plate and piston assembly and over the release springs and cylinder.

These and further objects of my invention will be set forth in the following specification, reference being had to the accompanying drawings, and the novel means by which said objects are effectuated will be definitely pointed out in the claims.

In the drawings:

Fig. 1 is a transverse section of my improved clutch in disengaged position taken along the line 1—1 in Fig. 2.

Fig. 2 is a longitudinal section taken along the line 2—2 in Fig. 1.

Fig. 3 is a fragmentary view of the clutch shown in Fig. 2, but in engaged position.

Fig. 4 is a transverse section of a modified form of clutch in disengaged position as viewed along the line 4—4 in Fig. 5.

Fig. 5 is a longitudinal section taken along the line 5—5 in Fig. 4.

By way of example, my improved clutch will be described as being of the pneumatically actuated type, although any gas or liquid may be employed as the power medium.

Referring to Figs. 1 to 3, inclusive, the numeral 10 designates a shaft which for purpose of description will be regarded as the driven member and which is keyed to a hub 11 having at one end a flange 12 which acts as the back or abutment plate of the clutch. The hub is peripherally splined or toothed at 13 and 14 for axially slidable and rotarily driven engagement with internally toothed plates 15 that are alternately related to friction plates 16 which are externally toothed for engagement with a driving member (not shown), such as a flywheel or other part. The direction of drive through the clutch may be reversed without affecting its operability.

The end of the hub 11 remote from the flange 12 is reduced in diameter to receive a cylinder ring 17 which is rotarily connected to the hub by a plurality of pins 18 having a diameter sufficient to withstand the inertial loads set up by rapid acceleration, deceleration or reversals of the clutch. The ring is bored to form an annular cylinder 19 which opens towards the clutch plates and slidably mounted in the cylinder is a piston assembly comprising a piston 20 provided with suitable packing 21 that may be cup-shaped, and a heat insulating ring 22 that may be made of molded asbestos or comparable material. The ring 22 abuts a pressure plate 23 and a stud 24 is threaded in this plate and extends through the ring 22 and piston 20 to receive a clamping nut 25 so that these parts move as a unit.

The plate 23 is internally toothed for driving engagement with the teeth 14, thus preventing, by reason of the rigid connection of this plate to the piston assembly, any relative rotation of the piston 20 in the cylinder. But for this connection, such rotation would occur during engagement and disengagement of the clutch and would result in undue wear of the piston packing 21 with consequent leakage or "blow by" of the air. In a clutch whose working cycle is repeated at short intervals, this wear becomes critical and requires frequent servicing of the unit. Further, where it is necessary that the clutch be quick acting, air leakage must be reduced to the utmost minimum, otherwise the clutch will be characterized by slow action.

Air under pressure is introduced into the cylinder 19 through a passage 26 in the ring 17 which is in communication with a passage 27 provided in an adaptor ring 28 that is secured to the ring 17. The passage 27 would connect through a rotating air seal (not shown) with a source of air under pressure. Seals of this type are well known in the art.

When air under pressure is supplied to the cylinder 19, the piston assembly, including the pressure plate 23, is moved towards the left from the position shown in Fig. 2 to clamp the plates 15 and 16 against the flange 12. Upon release of the air pressure, the clutch plates are freed for return to the release position shown in Fig. 2 through the medium of a plurality of studs 29 which are mounted in the pressure plate 23 and each of which extends through a pocket 30 provided in the outer, peripheral wall 31 of the cylinder ring 17. A helical spring 32 encircles that portion of each stud which is included within the associated pocket, one end of the spring seating against the base of the pocket while the opposite end abuts a washer 33 that slidably fits the pocket wall and is held against a shouldered portion of the stud by a nut 34. When the clutch is engaged, the springs are compressed. The reactive thrust of the cylinder ring 17 is taken by a thrust ring 35 that is threaded on the hub 11 and locked in position by a set screw 36 or like fastening.

A feature of the invention is the manner in which these springs are cooled. Unless the heat conducted to the springs from the pressure plate 23 is dissipated to a considerable extent, the springs quickly lose their temper and effectiveness. Accordingly, I propose to expose portions of the springs through the cylinder wall 31 to the cooling action of the atmosphere by means of continuous grooves 37 in and around this wall, the grooves being sufficiently deep to intersect the pockets 30. The grooves also assist in cooling the cylinder ring and piston assembly by increasing the surface of the ring for radiation and the wiping action of the air as the clutch rotates.

It will be observed that the piston assembly in the retracted position illustrated in Fig. 2 substantially fills the cylinder 19. Where air is employed as the actuating medium and a quickly responsive action is desired, it is important in view of the highly compressible nature of air that the volume of air behind the piston in its retracted position be held to a minimum. The construction shown accomplishes this result.

Another important aspect of my invention which is reflected in decreased wear of the packing ring 21 resides in the fact that the piston assembly is piloted in the cylinder 19 on the insulating ring 22, thus enabling the piston 20 to move freely without cocking. Moreover, the radial portion of the ring 21 is clamped between the ring 22 and the piston 20.

In an air operated clutch, it is desirable that as much as possible of the generated heat be dissipated in order to avoid increasing the temperature of the air in the cylinder. This result is accomplished partly by the grooving around the cylinder ring and additionally by radial channels 38 extending completely across that face of the insulating ring 22 which abuts the pressure plate 23. When the clutch is in the disengaged position shown in Fig. 2, the plate 23 is held against the adjacent face of the cylinder ring 17 by the springs 32 and the ring 22 including channels 38 are completely housed within the cylinder 19, but when the clutch is engaged, the piston assembly is shifted to the left with the pressure plate 23 and insulating ring 22 occupying the positions illustrated in Fig. 3. As shown, the plate 23 is spaced from the cylinder ring 17 to thereby uncover the ends of the channels 38. In this position, the outer ends of the channels communicate directly with the atmosphere, while the inner ends communicate with a plurality of passages extending through the interior of the clutch and spaced around its axis. One such passage is illustrated in Fig. 2 and includes an aperture 39 through the flange 12, aligned apertures 40 and 41 through the plates 15 and pressure plate 23, respectively, a duct 42 in the cylinder ring 17 and a duct 43 in the adaptor ring 28, it being understood that the rotating air seal, above referred to, would be secured to the ring 28 inwardly of the passage 43. Since the inner edges of the friction plates 16 are spaced from the hub 11, the foregoing apertures and ducts form a complete passage extending through the clutch with its ends open to the atmosphere. When the clutch is engaged, air is induced by the clutch rotation to flow through these passages and outwardly through the channels 38 across the face of the pressure plate 23, thus cooling this plate and, in conjunction with the insulating action of the ring 22, preventing the transmission of excess heat to the piston and cylinder.

The modification illustrated in Figs. 4 and 5 differs from that described above only in the construction of the piston assembly and the manner in which the piston is piloted in the cylinder. This assembly comprises an annular piston 44 having packing 45, a metallic ring 46 which abuts the piston and clamps thereagainst the radial portion of the packing 45, and a heat insulating ring 47. The latter ring is in face to face contact with the ring 46 and a pressure plate 48 which is related to the remainder of the clutch, including the cylinder ring 17, in the same manner as the plate 23 is to the clutch shown in Fig. 2. The plate 48 is rigidly secured to the assembly by studs 49 threaded in and around the plate and each of which extends through the assembly to receive a clamping nut 50 on the end thereof. The ring 46 is preferably formed of a good wearable metal, has bearing contact in the cylinder 51 and pilots the piston in its reciprocating movements. The width of the ring 47 is less than the width of the cylinder 51 radially of the clutch and the ring has clearance relative to the cylinder around its outer periphery, while the inner periphery seats on shoulders 52 and 53 provided on the ring 46 and plate 53, respectively. As with the design in Fig. 2, the ring 47 heat insulates the piston from the heat of the pressure plate 48 and cooling of the latter, as before, is provided by radial channels 54 in that face of the ring 47 which abuts the pressure plate and whose outer and inner ends, respectively, when the clutch is engaged, communicate with the atmosphere and with the passages extending interiorly of the clutch.

The clutch is characterized, particularly in the air cylinder and operating mechanism portions thereof, by compactness, ready access for repair and replacement, and long life of the parts by reason of the cooling and piloting features.

I claim:
1. In a fluid operated clutch, the combination of an annular cylinder for receiving the fluid medium, a piston movable in the cylinder, a clutch pressure plate operably related to and shiftable by the piston, and grooves formed in the outer periphery of the cylinder for increasing the surface area thereof to facilitate cooling.

2. In a fluid operated clutch, the combination of an annular cylinder for receiving the fluid medium, a piston movable in the cylinder, a clutch pressure plate operably related to and shiftable by the piston in one direction, grooves formed in the outer wall of the cylinder for increasing the surface area thereof to facilitate cooling, and spring means mounted in the cylinder wall for moving the plate in the opposite direction, portions of the means being exposed through the grooves for cooling.

3. In a fluid operated clutch, the combination of an annular cylinder for receiving the fluid medium, a piston movable in the cylinder, a clutch pressure plate operably related to and shiftable in one direction by the piston, grooves formed in the outer periphery of the cylinder for increasing the surface area thereof to facilitate cooling, a plurality of studs mounted in and spaced around the plate and extending through pockets in the cylinder, and a helical spring encircling each stud between an abutment thereon and the base of the associated pocket for shifting the plate in the opposite direction, the pocket wall being intersected by the grooves to provide cooling passages communicating with the atmosphere.

4. In a fluid operated clutch, the combination of a cylinder for receiving the fluid medium, a piston assembly movable in the cylinder comprising a piston, a heat insulating ring, and a metallic ring interposed between the piston and insulating ring and acting to pilot the assembly in the cylinder, and a clutch pressure plate rigidly connected to the assembly in face to face contact with the insulating ring and mounted for axial movement relative to the cylinder.

5. In a fluid operated clutch, the combination of a cylinder for receiving the fluid medium, a piston assembly movable in the cylinder comprising a piston, a heat insulating ring, and a metallic ring interposed between the piston and insulating ring and acting to pilot the assembly in the cylinder, a clutch pressure plate rigidly connected to the assembly in face to face contact with the insulating ring and mounted for axial movement relative to the cylinder, and means engaging the plate to prevent rotation relative to the cylinder.

6. In a fluid operated clutch, the combination of a cylinder for receiving the fluid medium, a piston assembly having substantially radial grooves in one end and movable in the cylinder to uncover the ends of the grooves beyond the open end of the cylinder when the clutch is engaged, and a clutch pressure plate rigidly secured to the assembly in face to face contact with the grooved assembly end, air being induced from interiorly of the clutch to flow outwardly along the grooves to cool the plate during clutch engagement.

7. In a fluid operated clutch, the combination of a cylinder for receiving the fluid medium, a piston member movable in the cylinder, a clutch pressure plate rigidly connected to the member and disposed adjacent the open end of the cylinder, and an insulating ring positioned between the member and plate, the plate contacting face of the ring being channeled along substantially radial lines of the clutch and located beyond the open end of the cylinder during clutch engagement whereby air induced from interiorly of the clutch flows outwardly along the channels and cools the plate.

8. In a fluid operated clutch, the combination of a cylinder for receiving the fluid medium, an assembly movable as a unit and comprising piston means shiftable in the cylinder and a clutch pressure plate in face to face contact with the means beyond the open end of the cylinder, the assembly including passages extending therethrough disposed along substantially radial lines of the clutch and whose ends are exposed when the clutch is engaged whereby air induced from interiorly of the clutch flows outwardly through the passages to cool the plate.

9. A fluid operated clutch comprising in combination, a hub having air passages extending therethrough from at least one end thereof, friction members attachable to the hub and a separate rotary part, respectively, a pressure plate and a cylinder for receiving the fluid medium mounted on the hub, and a piston assembly having substantially radial channels in one end movable in the cylinder to shift the pressure plate to clamping position whereby the ends of the channels are uncovered beyond the open end of the cylinder when the clutch is engaged, the channeled end being in face to face contact with the plate and air being induced to flow through the hub passages and outwardly through the channels to cool the plate.

10. A fluid operated clutch comprising in combination, a hub having air passages extending therethrough from at least one end thereof, friction members attachable to the hub and a separate rotary part, respectively, a pressure plate and a cylinder for receiving the fluid medium mounted on the hub, a piston assembly having substantially radial channels in one end movable in the cylinder in one direction to shift the plate to clamping position and uncover the ends of the channels beyond the open end of the cylinder, the channeled end being in face to face contact with the plate and air being induced to flow through the hub passages and outwardly through the channels to cool the plate, and spring means mounted in the cylinder wall for moving the assembly in the opposite direction and having portions exposed through the cylinder wall for cooling.

11. A fluid operated clutch comprising in combination, a hub having air passages extending therethrough from at least one end thereof, friction members attachable to the hub and a separate rotary part, respectively, a pressure plate and an annular cylinder for receiving the fluid medium mounted on the hub, and a piston assembly movable in the cylinder comprising a piston member and a heat insulating ring disposed between the member and plate, the plate contacting face of the ring having substantially radial channels whose ends are uncovered beyond the open end of the cylinder when the clutch is engaged and air being induced to flow through the hub passages and outwardly through the channels to cool the plate.

12. In a fluid operated clutch, the combination of a cylinder for receiving the fluid medium, a piston member having substantially radial grooves in one end and movable in the cylinder to uncover the ends of the grooves beyond the open end of the cylinder when the clutch is engaged, and a clutch pressure plate engaged by the grooved end of the member, air being induced from interiorly of the clutch to flow outwardly along the grooves to cool the plate during clutch engagement.

13. A fluid operated clutch comprising in combination, a hub having air passages extending therethrough from at least one end thereof, friction members attachable to the hub and a separate rotary part, respectively, a pressure plate and a cylinder for receiving the fluid medium mounted on the hub, grooves formed in the outer wall of the cylinder for increasing the surface area thereof to facilitate cooling, a piston assembly having substantially radial channels in one end movable in the cylinder in one direction to shift the plate to clamping position and uncover the ends of the channels beyond the open end of the cylinder, the channeled end being in face to face contact with the plate and air being induced to flow through the hub passages and outwardly through the channels to cool the plate, and spring means mounted in the cylinder wall for moving the assembly in the opposite direction and having portions exposed through the grooves in the cylinder wall for cooling.

NICHOLAS F. ADAMSON.

REFERENCES CITED

The following references are of record in the file of this patent:

UNITED STATES PATENTS

| Number | Name | Date |
|---|---|---|
| 1,790,516 | Williams | Jan. 27, 1931 |
| 1,968,129 | Criley | July 31, 1934 |
| 1,968,130 | Criley | July 31, 1934 |
| 2,057,744 | Sanford | Oct. 20, 1936 |
| 2,060,773 | Pearmain | Nov. 10, 1936 |
| 2,094,065 | Frank | Sept. 28, 1937 |
| 2,123,867 | Criley | July 19, 1938 |
| 2,164,844 | Snider | July 4, 1939 |
| 2,190,874 | Jarrett | Feb. 20, 1940 |
| 2,241,242 | Friedman | May 6, 1941 |
| 2,282,143 | Carter | May 5, 1942 |
| 2,359,516 | Frank | Oct. 3, 1944 |